(No Model.)  2 Sheets—Sheet 1.
W. H. LOWE.
VEHICLE RUNNING GEAR.
No. 413,403. Patented Oct. 22, 1889.
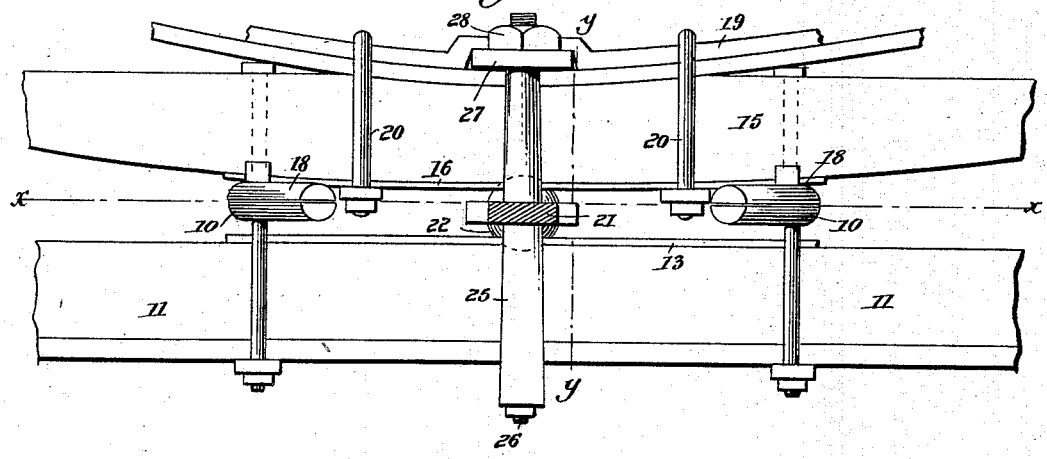
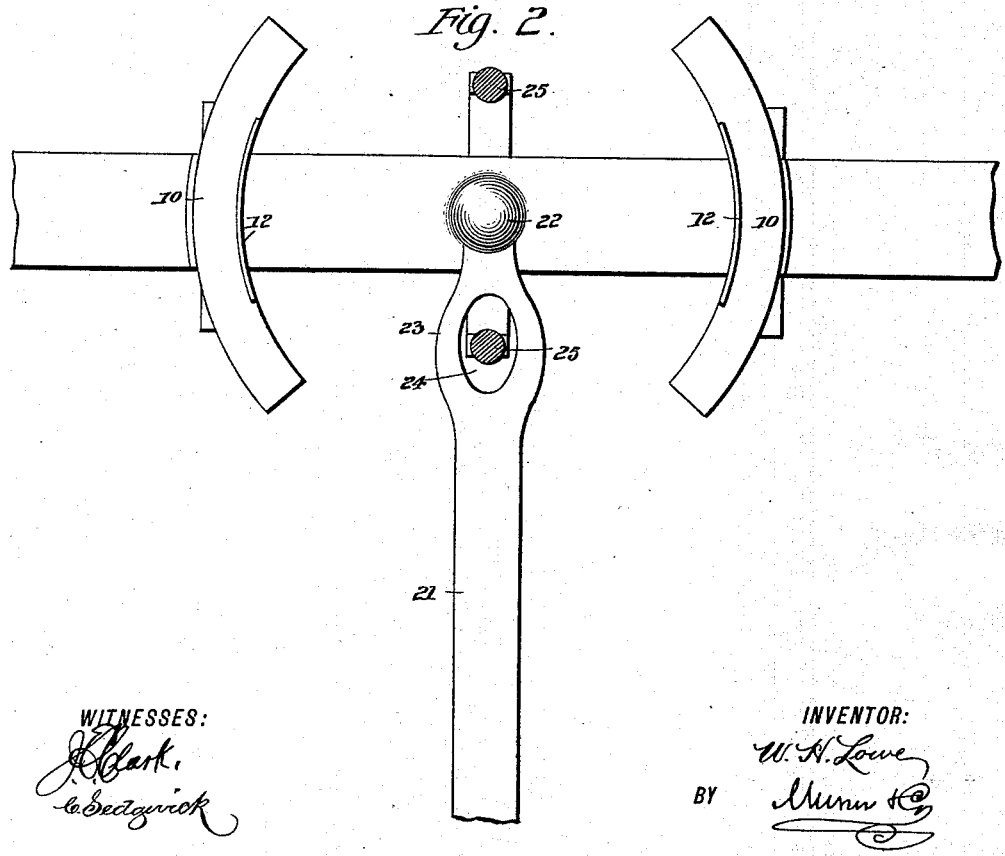
WITNESSES:
J. Clark.
C. Sedgwick.
INVENTOR:
W. H. Lowe
BY Munn & Co.
ATTORNEYS.

(No Model.)  W. H. LOWE.  2 Sheets—Sheet 2.
VEHICLE RUNNING GEAR.
No. 413,403.  Patented Oct. 22, 1889.
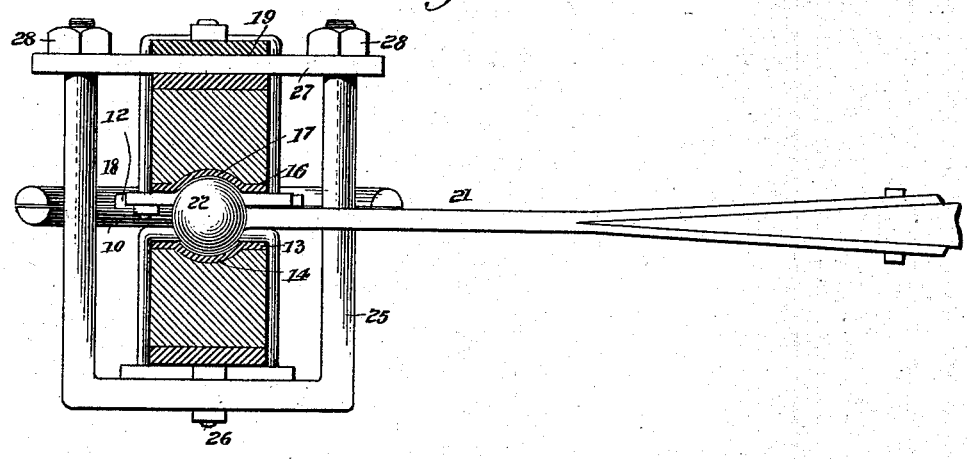
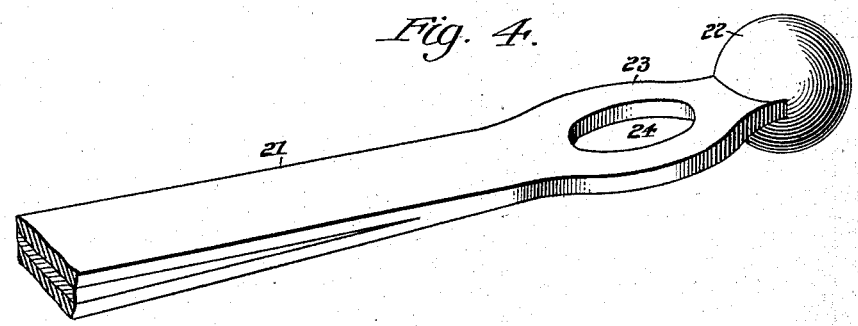
WITNESSES:  INVENTOR:
J. J. Clark.  W. H. Lowe
C. Sedgwick  BY  Munn & Co.
ATTORNEYS.

UNITED STATES PATENT OFFICE.

WADE H. LOWE, OF CAMPTI, LOUISIANA, ASSIGNOR TO HIMSELF AND ELIAS I. PERSINGER, OF SAME PLACE.

VEHICLE RUNNING-GEAR.

SPECIFICATION forming part of Letters Patent No. 413,403, dated October 22, 1889.

Application filed April 20, 1889. Serial No. 308,026. (No model.)

*To all whom it may concern:*

Be it known that I, WADE H. LOWE, of Campti, in the parish of Natchitoches and State of Louisiana, have invented a new and useful Improvement in Vehicle Running-Gears, of which the following is a full, clear, and exact description.

My invention relates to an improvement in running-gears for vehicles, especially to the construction of the fifth-wheel and the coupling of the tongue.

The invention has for its object to dispense with the use of a king-bolt, to attach the tongue to the head-block and axle by a ball-and-socket joint, and to provide a fifth-wheel of economical and durable construction; also, to provide a means whereby the head-block may be expeditiously and conveniently disconnected from the axle and the tongue detached.

The invention consists in the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1 is a front elevation of the head-block and axle and a portion of the spring, the tongue being in transverse section. Fig. 2 is a section on line $x\ x$ of Fig. 1. Fig. 3 is a vertical section on line $y\ y$ of Fig. 1, and Fig. 4 is a detail plan view of the tongue-coupling.

In carrying out the invention a segmental plate 10, constituting the lower section of a fifth-wheel, is clipped in any approved manner to the axle 11, at each side of the center of the same, the said segmental plate 10 being provided upon its inner edge at the center with an upwardly-extending flange 12, as best illustrated in Fig. 2. Beneath the segmental plates 10, which have a flat upper surface, a bar or plate of metal 13 is secured to the upper face of the axle, in the event that the said axle is constructed of wood; but if the axle is constructed of metal, the said plate may be dispensed with. In the plate 13, at its center, a concavity 14 is produced, as shown in Fig. 3, which concavity, when the axle is made of metal, is produced directly upon the upper face of the same. The head-block 15 is provided upon its under face with a like plate 16, secured thereto, and in the plate of the head-block at its center, and in vertical alignment with the concavity in the axle-plate 13, a similar concavity 17 is produced, likewise illustrated in Fig. 3, the two concavities being preferably circular. Upon the under face of the head-block 15 the upper section of the fifth-wheel is rigidly secured, consisting of a segmental plate 18, attached at each side of the center, conforming to the radius of the lower plate 10 or section of the fifth-wheel, the said upper plate or section 18 of the said fifth-wheel being provided with a flat under face adapted for contact with the equivalent surface of the lower fifth-wheel section.

In operation, the upper fifth-wheel section is adapted to slide upon the lower fifth-wheel section, being guided thereon by the flange 12. A spring 19 is attached to the head-block by means of clips 20, or in any other approved manner. The tongue of the vehicle is provided with a metal tip or shank 21, which is rigidly attached to the rear end, which tip or shank terminates at the rear extremity in a ball 22, and is enlarged near said ball, as illustrated at 23 in Fig. 4, in which enlarged portion of the shank a longitudinal (preferably oval) opening 24 is formed, as best illustrated in Figs. 2 and 4. The ball 22, or what I may properly designate as the "tongue-coupling," is made to contact with or is seated in the opposed cavities 14 and 17, produced, respectively, in the axle and in the head-block, as best shown in Fig. 3. The two surfaces contacting upon the ball—namely, the head-block and axle—are held in contact by a U-shaped yoke or bar 25, the body of which U-shaped bar is pivoted upon a stud or post 26, projected vertically downward from the axle at its center, as best illustrated in Figs. 1 and 3. The members of the said U-bar 25 project upward above the head-block, the front member passing through the opening 24 in the tongue-coupling, and the two members of the head-block are connected, preferably, by a tie-plate 27 entered thereon, and a jam-nut 28 is screwed upon the upper end of each of the members of the U-bar, which are threaded to a contact with the plate.

The plate is usually passed beneath the upper leaf of the spring 19, which leaf is indented or upset upon the under face to permit the passage of the tie-bar, as illustrated in Fig. 1.

It will be observed that by means of the construction above set forth the king-bolt is dispensed with, that a fifth wheel is formed in the simplest possible manner, and that the sliding plate upon the inside of the fifth wheel prevents it from slipping in any direction, holding the head-block when in any position always in the center of the axle.

It will also be observed that the bearing of each of the upper and lower sections of the fifth-wheel is equal, and that the ball-and-socket connection between the tongue of the vehicle and the head-block and axle effectually overcomes all friction.

When the running-gear is constructed as heretofore stated, a vehicle can be turned shorter than when other forms of well-known shaft or tongue couplings are employed with less danger of breaking. The ball is movable in any position, as when the vehicle strikes any obstruction, such as passing over logs, for instance, or running over ruts or holes, or any movement causing either the front or the hind wheels to be carried out of position. A break is prevented by the free play of the ball in its socket. The ball-coupling also does away with all the iron on the reach-pole except one piece, which can be run all the way beneath the bottom of the reach, as there is no strain upon it, except a straight pull.

As heretofore stated, this coupling is easily taken apart and put together again, only two nuts having to be removed from the U-bar 25. The attachment can be made to any vehicles now in use, replacing the king-bolt, and thereby rendering the said vehicle stronger and safer, as the coupling described in this application is much more durable than any king-bolt heretofore constructed.

The ball and the plates constituting the sockets for such ball are preferably made of chilled or hardened iron, and, as the friction is reduced to a minimum, the coupling will wear indefinitely.

Having thus described my invention, I claim as new and desire to secure by Letters Patent—

1. The combination, with the front axle and head-block, having registering concavities in the centers of their adjacent faces, and a tongue-iron provided with a ball within said socket, of upper and lower segmental plates at the opposite sides of the sockets and clipped to the axle and head-block, substantially as set forth.

2. The combination, with the axle and head-block of a vehicle, having vertically-aligning sockets produced in their opposed faces, of a vehicle-tongue provided with a ball at the inner end seated in the sockets of the axle and head-block, a U-bar swiveled to the axle and passing upward at front and rear of the said axle and head-block, the forward member of the U-bar also passing through the tongue, and means, substantially as shown and described, for locking the U-bar to the head-block, as and for the purpose specified.

3. The combination, with the axle and head-block of a vehicle, having vertically-aligning sockets produced in their opposed faces, and a vehicle-tongue provided with a ball at its inner end seated in said sockets, and a longitudinal opening in advance of a ball, of a U-bar pivoted beneath the axle, the members of which extend vertically upward beyond the head-block, the forward member of the U-bar passing through an opening in the tongue, a tie-plate connecting the members of the U-bar above the head-block, and jam-nuts screwed upon the said members in contact with said plate, substantially as shown and described.

4. The combination, with the axle and head-block of a vehicle, provided with sockets in their opposed faces and a tongue terminating in a ball, which ball is seated in said sockets, of a segmental plate secured at each side of the center, respectively, of the opposed faces of the axle and head-block, constituting a fifth-wheel, the contacting faces of which fifth-wheel sections are flattened, the under sections being provided with a flange upon the inner face, all combined for operation substantially as shown and described.

5. In a vehicle, the combination, with the axle and head-block, of a segmental bar provided with a flattened upper face and a vertical flange integral with its inner edge, secured to the axle, one at each side of the center, and a second segmental bar secured to the under face of the head-block at each side of the center, having a flattened under surface adapted to contact with and slide upon the equivalent surface of the axle-bars, substantially as shown and described, whereby a fifth-wheel is formed of light, durable, and simple construction, as set forth.

6. A tongue-iron 21, having a ball at its inner end, and a slot 24 just in advance of the ball and in rear of the portion to which the tongue is to be secured, substantially as set forth.

WADE H. LOWE.

Witnesses:
ISÉDORE RAPHIEL,
HOWARD RAPHIEL.